Dec. 25, 1962 G. BUDNICK 3,070,700

PROCESS AND DEVICE FOR REDUCING SCANNING AND INDEXING ERRORS OF FINE DIVISIONS

Filed Feb. 17, 1959

GÜNTHER BUDNICK

INVENTOR.

BY Cushman, Darby & Cushman

ATTORNEYS 3,070,700
Patented Dec. 25, 1962

3,070,700

PROCESS AND DEVICE FOR REDUCING SCANNING AND INDEXING ERRORS OF FINE DIVISIONS

Günther Budnick, Darmstadt, Germany; Thea Budnick heir and legal representative of minor children of said Günther Budnick, deceased Filed Feb. 17, 1959, Ser. No. 793,842
Claims priority, application Germany Feb. 24, 1958
5 Claims. (Cl. 250—208)

This invention relates broadly to the art of producing electrical signals in response to increments of movement and is particularly concerned with producing very accurately timed signals in response to scanning of indices carried on a moving body, or existing by virtue of the movement thereof.

When one wishes to obtain a signal representative of, for example, a time position of a rotating disc, it is well-known to provide such disc with some index mark, such as a slot, and to position some scannng means adjacent the disc, such as a light on one side of the disc adapted to cooperate with a photocell located on the other side of the disc whereby as the disc rotates, the slot passes between the light and photocell, and as a result the photocell is energized whereby to produce a time signal for each revolution. Such a scanning system as that described above for exemplary purposes, may prove satisfactory under certain operating conditions. However, when a plurality of index slots are provided in the exemplary form of system discussed above so as to obtain a plurality of time signals from a single scanning arrangement, then eccentricity of the disc, as well as the inaccuracies in positioning of the slots, cause somewhat inaccurately timed signals in any signal sequence produced as a result of a scanning operation. The limitations on accuracy considered hereinabove are essentially the same whether a slotted disc is used, a disc carrying magnetic indices is used, a disc carrying line indices is used, and also in instances where a longitudinally movable member carrying indices is used or a longitudinally movable body adapted to produce indices is used. Specifically, where the arrangement is such that scaning signals are produced in response to incremental movement of a body, from some form of index mark or marks carried by the body or from indexing images, then the inaccuracies in mounting of the body, as well as the inaccuracies in positioning of the index marks or images cause corresponding inaccuracies in the scanning signal produced by the particular scanning arrangement or device.

Thus, there exists a need for a basic scanning method which can be used in instances where the accuracy requirements are stringent, but which at the same time permits achieving of the scanning operation with components of the type which are now known and readily available. A primary object of the present invention is to provide such a method, and consistant with this primary object, an auxiliary object of the present invention is to provide such a method which yields great accuracy by carrying out the scanning operation so as to compensate for inherent inaccuracies resulting from the "eccentricities" of the movable body carrying the indices to be scanned, or producing the indices to be scanned.

Still further, yet somewhat more specific objects of the present invention are: (*a*) to provide a scanning method conforming with the preceding objects, which method is adapted for use in connection with rotating discs carrying indices thereon, longitudinally movable bodies carrying indices thereon, as well as various other forms of bodies provided with index marks which are to be scanned; (*b*) to provide such a method which is equally applicable to scanning techniques based on the production of moiré fringe patterns; (*c*) to provide such a method wherein a plurality of individual scanning signals are produced for each increment of movement scanned, and wherein such plurality of signals are combined to produce a single separate signal having a mean characteristic indicative of the mean time of occurrence of the plurality of individual scanning signals; (*d*) to provide such a method which can be used in connection with various forms of apparatus to produce a single means scanning signal having a time accuracy above and beyond the accuracy heretofore obtainable; and (*e*) to provide such a method which can be carried out with systems incorporating available components.

In accordance with the basic aspects of the invention, more than two individual scanning signals are produced in response to incremental movement of a given body, and the plurality of individual scanning signals are combined to yield a single separate signal having a time of occurrence representative of the mean time of occurrence of all the individual scanning signals produced. The invention will be better understood, and objects other than those specifically set forth above will become apparent, when consideration is given to the following detailed description. Such description refers to the annexed drawings, wherein:

Figure 1:
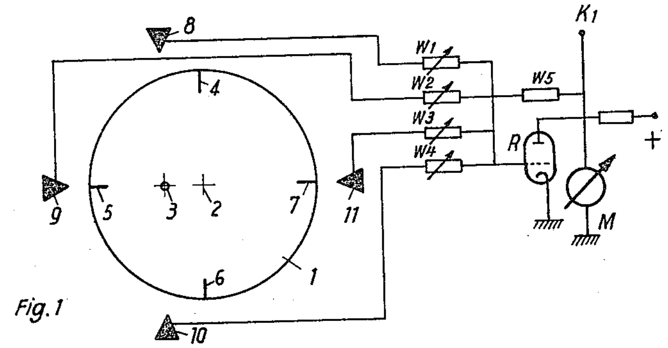
FIGURE 1 is a schematic view presenting illustratively the manner in which the invention is applied to a rotating disc carrying a plurality of indices thereon.

In the illustrative representation of FIGURE 1, the movable body to be scanned is shown as comprising a disc 1 carrying a plurality of indices 4–7 adjacent the periphery thereof. The indices, in this instance, can be considered as taking the form of dark line index marks. However, as will be apparent from the following explanation, the indices 4–7 can comprise slots, magnetic deposits, or other media adapted to cooperate with a scanning device to produce an electrical signal. Moreover, while only four index marks have been shown, in most instances the movable member will or can carry as many index marks as desired.

For purposes of scanning the indices, a plurality of scanning devices 8–11 are incorporated. Each device is adapted to produce an electrical signal as an index mark passes thereby. In the illustrative representation of FIGURE 1, one scanning device is provided for each index mark. If the index marks comprise for example, dark lines, then the scanning devices 8 through 11 comprise photocells. On the other hand, if for example, the index marks were magnetic spots, then the scanning devices 8 through 11 would comprise magnetic pick-ups. Similarly, if the index marks in fact constituted slots, then each of the scanning devices can well comprise a light disposed on one side of the disc, and a photocell disposed on the other side of the disc. It is to be understood that the particular form of scanning means incorporated is not an essential part of the invention, because the invention lies in the method of scanning rather than the particular type of index and associated scanning unit used.

With the arrangement shown in FIGURE 1, the scanning devices 9 and 11 are disposed diametrically on opposite sides of the scanning disc 1, and the index marks 5 and 7 are disposed at opposite ends of the diameter thereof. The index marks 4 and 6, on the other hand, are disposed at opposite ends of a geometric diameter extending perpendicular to the diameter that is coaxial with the index marks 5 and 7. Additionally, it will be noted that in the arrangement of FIGURE 1, when the disc 1 rotates clockwise, then the index mark 4 passes the scanning device 8 before the index mark 6 passes the scanning device 10. In other words, with the system of FIGURE 1, upon clockwise rotation of the disc 1, signals are simultaneously produced by the scanning devices 9 and 11, whereas a signal is produced earlier by the scanning device 8, and later by the scanning device 10.

The disc 1 is shown in FIGURE 1 as having a geometric center at 2, but for purposes of consideration of this invention, is assumed to rotate about the eccentric axis 3. As readily appreciated by those of ordinary skill in the art, it is impossible to form and mount any disc for rotation so that the same covers a perfectly circular path. Instead, in every instance, due to mechanical limitations, any rotating disc is mounted eccentrically to a certain extent. In FIGURE 1, the eccentric mounting is largely exaggerated, but such exaggeration facilitates an understanding of the invention since, as pointed out above, the eccentric mounting results in inaccurate signals in the event the method hereof is not employed.

In further explanation of FIGURE 1, assume that the scanning devices 8 through 11 comprise photocell units, and that the index marks 4–7 comprise dark lines on the disc 1. Also, assume that the disc 1 is rotating. With the rotation of the disc 1, as the index lines 4 through 7 approach respectively the scanning devices or photocells 8 through 11, the photocells produce a signal in the form of a pulse. Specifically, each photocell 8, 9, 10, and 11 produces a separate signal as the most proximate index mark passes thereby. These separate signals are hereinafter referred to as individual scanning signals.

Consistant with the method of the present invention, the individual scanning signals produced by the scanning devices 8–11 are mixed to produce a single separate signal having a predetermined characteristic which occurs at a time representative of the mean time of occurrence of all of the individual scanning signals. Specifically, with respect to the arrangement of FIGURE 1, each of the scanning devices 8 through 11 is connected with an adjustable resistance component, *w*1, *w*2, *w*3, and *w*4, and each of the adjustable resistance components is connected together by a common lead 30. This lead is directly coupled to the grid of an exemplary amplifier tube R, and is also coupled through the resistor *w*5 with the plate circuit of the amplifier tube. The circuit arrangement of the adjustable resistors and amplifier tube is a standard summation circuit, and it will be understood that other forms of summation networks can be used, as well as similar types of mixing circuits. For a specific discussion of the types of arrangements which can be used for purposes of mixing the individual scanning signals in accordance with the method hereof, attention is directed to Chapter 18 of the book Waveforms volume 18, Radiation Laboratories Series, McGraw-Hill Book Company, Inc., New York, 1959.

Figure 2:
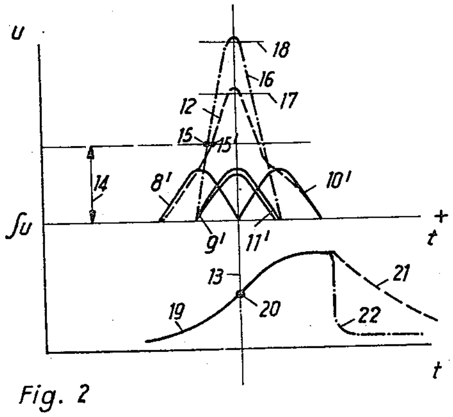
FIGURE 2 is a schematic graphical representation presenting illustratively the relationship between signals produced by the system of FIGURE 1.

Summation circuits of the type described in the aforesaid publication and as shown in FIGURE 1, serve, in accordance with the method hereof, to combine all of the individual scanning signals and produce a single separate signal. This combining operation may be best understood by reference to FIGURE 2, wherein the signal produced by the scanning device 8 is designated by the numeral 8′, the signal produced by the scanning device 10 is designated by the numeral 10′, the signal produced by the scanning device 9 is designated by the numeral 9′, and the signal produced by the scanning device 11 is designated by the numeral 11′. (Of course, these prime numerals refer to wave forms representative of the signal produced by the individual scanning units.) If the axis 13 of FIGURE 2 is considered as a time axis, which time axis is coincident with the peak value of the waveforms produced by the scanning devices 9 and 11, then the representation of FIGURE 2 presents the waveforms produced by the respective scanning devices in proper time sequence. As suggested above, these signals are mixed to provide a summation thereof in the network of FIGURE 1. The summation signal produced by such network is designated in FIGURE 2 by the numeral 12. This individual separate signal or summation signal, in the network or arrangement of FIGURE 1, is fed to the measuring instrument M as well as to the output connection designated by *k*1. The output terminal *k*1 may be connected with any suitable device adapted to switch on or off some operation, or adapted to produce a more refined single separate signal, as explained more fully herebelow.

Assume temporarily that the single separate signal which is produced is to be used for control purposes. In this instance, as should be apparent to those skilled in the art, as opposed to having a full summation curve such as designated by the numeral 12 in FIGURE 2, it is more desirable to have a true pulse waveform whose position with respect to time is better defined by a steep leading edge. If this form of control signal is desired, then the output from the network of FIGURE 1, i.e. the signal appearing at point *k*1, which corresponds to the waveform 12 (FIGURE 2), can be fed to a Schmitt-trigger or other suitable form of relaxation circuit adapted to be triggered when the input thereof reaches a predetermined voltage value. Assume, for example, that the relaxation circuit is of the type which is adapted to be triggered when a signal fed thereto has an amplitude of a predetermined value. Assume further, that this "triggering amplitude" corresponds to the amplitude designated schematically by the numeral 14 in FIGURE 2. In this instance, as single separate signals are produced the amplitude of the summation curve increases initially, and the input to the separate circuit increases. When the input to the separate circuit reaches a value corresponding to that shown by the point 15, then the separate circuit which is here assumed to be a Schmitt-trigger, is energized. For specific examples of the type of circuits which can be energized by the network of FIGURE 1 for control purposes in the manner explained above, attention is directed to Chapter 9, pages 352–363 of the aforesaid book entitled Waveforms.

Although some general mention has been made hereinabove with respect to the eccentricity of the scanning disc 1 as related to the ultimate signal being produced, this concept will be better understood by again referring to FIGURE 2. If the disc 1 was not eccentrically mounted in any way, then the signals produced by the scanning devices 8 through 11 would occur in synchronism, and the resulting waveform produced at the output *k*1 or measuring instrument M would appear as a waveform such as that designated by the numeral 16. In this instance, any separate control circuit, here assumed to be a Schmitt-trigger, would be energized when the voltage value 15 was reached. However, as suggested, the disc 1 is not exactly mounted, and there is some eccentricity therein. Thus, the waveform which is produced at the output of the summation circuit of FIGURE 1 appears as the waveform designated by the numeral 12 in FIGURE 2. However, from FIGURE 2, it is apparent that this waveform has a predetermined magnitude, such as the magnitude designated by the numeral 14, at the time 15′. This time is substantially the same as the theoretically perfect time 15, but does differ slightly therefrom. However, the distance between the points 15 and 15′, time-wise, is substantially smaller than the distance between the axis 13 and the peak of the waveform 8′ for example. In other words, if the waveform 8′ is considered to represent a signal produced by a single device, then its position with respect to an accurate time may differ by as much as the distance between the axis 13 and the peak of the waveform 8′. However, when the invention is used, the difference in timing is substantially reduced, and as noted, the theoretical exact time 15 does not differ substantially from the practical exact time 15'.

While reference has been made hereinabove to a triggering circuit, it is to be understood that the output of the network of FIGURE 1 can be fed to other types of circuits, such as a modulation circuit, for example. In this instance, a limiting arrangement would be incorporated which passes only the peak of the summation wave 12, or theoretically the peak of the theoretical summation wave 16 to a modulation tube, or what is commonly known as a detector tube. Alternatively, such peak may be passed to a point-contact (peak) type rectifier. Circuit arrangements of the type discussed in this paragraph are shown and explained in sub-chapter 9.18, "Sine-Wave-Peak Comparison," page 350 of the aforesaid book entitled Waveforms.

A further modification of the present invention contemplates utilizing an integrating technique wherein the output signal from the network of FIGURE 1 is fed to an integrating arrangement adapted to ultimately produce a pulse of desired configuration. In this instance, the summation waveform may be plotted to appear as the waveform designated by the numeral 19 in FIGURE 2, and the control over such waveform at the ultimate end thereof can be performed by either an RC circuit, or a reset circuit, whereupon the waveform reduces to its initial value either as indicated by the waveform 21, or as indicated by the waveform 22 respectively. It will be noted that the mean magnitude of the signal 19 occurs at the time axis 13, thereby giving a predetermined characteristic for purposes of energizing the integrating network. Integration networks or circuits of the type contemplated in this paragraph are described in the aforesaid mentioned book entitled Waveforms on page 648, in Chapter 18.5 "Methods of Differentiation and Integration." Circuit arrangements performing the pulse restorations referred to, are also mentioned in such book, and an exemplary form which may be used is presented and described on page 509, in FIGURE 14.9 of such book.

From the above description of the method hereof, as applied to a rotating indexing disc, the advantages of the invention should be apparent. The influence of the eccentricity of the mounting of the disc is substantially eliminated, and compensation is made for any inaccuracy in positioning. It will be noted that the method definitely overcomes the positioning inaccuracies of the index marks. Specifically, the scanning methods hereof reduce the different (individual) errors in the position ($\Delta Y$) of one indexing mark with respect to the probable mean error ($\Delta Y'$) in accordance with the well-known law $\Delta Y'=\sqrt{\Delta Y^2 n}$, wherein $n$, is the factor designating the number of scanning points. The scanning accuracy increases with the root of the number of scanning points, and thus the more scanning points utilized, the greater the accuracy. Thus, whether the invention is applied to a circular movable member having indices thereon, or a longitudinally movable member, as suggested above, the accuracy can be increased by increasing the number of scanning points.

Although a mechanical arrangement has been shown hereinabove with respect to the method contemplated hereby, it is to be understood that the invention is also applicable to optical techniques. Consider, for example, the well-known cross lines produced by two optical defraction gradings which are positioned in overlapping relation. Such crossing lines form a pattern commonly known as a moire fringe pattern. Details of the method of producing a moire fringe pattern by movement of two gradings with respect to one another are set forth in applicant's publication entitled "Das Messen von Geschwindigkeiten an Werkzeugmaschinen mit Hilfe elektrischer Verfahren", VDI-Forschungsheft No. 470, as appended to "Forschung auf dem Gebiete des Ingenieurwesens," issue B, volume 24, 1958, VDI-Verlag Duesseldorf. All necessary details may be taken from page 40 of this publication in Chapter 8.1 and the illustrations 54, 55 and 56, as well as from Chapter 8.2, and the illustrations 57 and 58.

Figure 3:
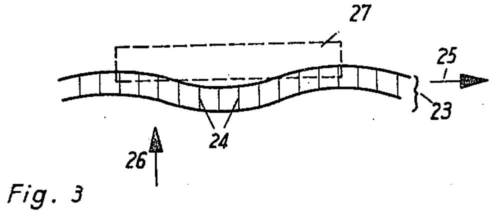
FIGURE 3 is a schematic view presenting illustratively the manner in which the method of the invention may be applied to a scanning system incorporating optical means producing an indexing moiré fringe pattern.

In FIGURE 3, a typical moiré fringe pattern is shown and designated by the numeral 23. This pattern consists of a plurality of crossing points or lines designated by the numeral 24. Actually, the lines, strictly speaking, provide therebetween a rhombic shape, but for purposes of simplicity, they can be considered and shown to have a rectangular shape. The envelope of these lines, i.e. the pattern 23, represents an image of the mean values of the various lines. When one defraction grading is moved with respect to the other, in the direction indicated by the arrow 25, then the pattern 23 will move in the direction of the arrow 26. Since such pattern, as noted, represents a mean, in accordance with the method hereof, this pattern is in effect picked up to produce the single separate signal. Specifically, a sensitive surface such as the elongate photoelectric surface schematically designated by the numeral 27 can be disposed so as to receive a plurality of the pattern lines. In this manner, as the photoconductive surface receives the plurality of lines, a mean signal is produced by such surface, which signal is a summation signal having a time magnitude representative of the time position of the individual lines 24. Although the photoconductive layer 27 has been described above, it will be understood that the light pattern may be received by a plurality of photocells, or by one photocell with a plurality of photosensitive surfaces, or by a single elongate photoelectric surface adapted to produce an electrical signal in response to receiving light thereon. Moreover, a lens system can be incorporated for purposes of combining the individual lines of the light pattern. In any instance, however, by virtue of the incremental movement between the gradings, a plurality of individual scanning signals are produced, and these separate signals are combined into a single separate signal representative of the individual signals, or having a characteristic occurring at the mean time of occurrence of the individual scanning signals.

It will be appreciated that with the optical arrangement described, the mean value or time of occurrence of a given incremental movement can be obtained from separate signals numbering in the thousands, and thus, the accuracy can be extremely great. While it is basically suggested that the optical gradings might be moved longitudinally above, it will be understood that the invention is applicable to gradings moved circularly.

After reading the foregoing detailed description of the illustrative and preferred embodiments of the present invention, it should be apparent that the objects set forth at the outset of this specification have been successfully achieved. Accordingly,

What I claim is:

1. In a method of scanning small increments of movement and producing electrical signals for each division scanned, the steps of producing more than two electrical index signals for each increment scanned, and electrically combining said index signals to obtain a single separate signal having a predetermined deviation from a reference level at the mean time of occurrence of all of said index signals.

2. In a method of scanning small increments of movement and producing electrical signals for each division scanned, the steps defined in claim 1 wherein said index signals are electrically combined by summation thereof, and wherein said single separate signal is a summation wave, having a peak magnitude at said mean time.

3. In a method of scanning small increments of movement and producing electrical signals for each division scanned, the steps defined in claim 1, wherein said electrical index signals are produced in response to more than two radiant energy signals developed for each division scanned.

4. In a method of scanning small increments of movement and producing electrical signals for each division scanned, the steps of producing more than two electrical index signals for each increment scanned, electrically summing all of said index signals to provide a summation wave, and integrating said summation wave to provide an output wave having a mean amplitude at the mean time of occurrence of all of said index signals.

5. In a method of scanning small increments of movement and producing electrical signals for each division scanned, the steps of producing more than two radiant energy signals for each increment scanned, and electrically combining all of said radiant energy signals in a photoconductive layer to produce an electrical signal having a maximum deviation from a reference level at the mean time of occurrence of all of said radiant energy signals.

References Cited in the file of this patent

UNITED STATES PATENTS

| | | |
|---|---|---|
| 1,642,733 | Jenkins | Sept. 20, 1927 |
| 1,886,188 | Hough | Nov. 1, 1932 |
| 2,416,968 | Turrettini | Mar. 4, 1947 |
| 2,651,771 | Palmer | Sept. 8, 1953 |
| 2,734,188 | Jacobs | Feb. 7, 1956 |
| 2,845,710 | Claret et al. | Aug. 5, 1958 |
| 2,857,802 | Cail | Oct. 28, 1958 |
| 2,861,345 | Spencer | Nov. 25, 1958 |
| 2,930,895 | Kuehne | Mar. 29, 1960 |

FOREIGN PATENTS

| | | |
|---|---|---|
| 315,921 | Switzerland | Oct. 31, 1956 |